US008405671B2

(12) United States Patent
Blaut et al.

(10) Patent No.: US 8,405,671 B2
(45) Date of Patent: Mar. 26, 2013

(54) COLOR CONTROLLER FOR A LUMINAIRE

(75) Inventors: Roni Blaut, Netanya (IL); Arkadiy Peker, New Hyde Park, NY (US); James Aralis, Mission Viejo, CA (US); Simon Kahn, Jerusalem (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 917 days.

(21) Appl. No.: 12/400,813

(22) Filed: Mar. 10, 2009

(65) Prior Publication Data

US 2009/0231354 A1 Sep. 17, 2009

Related U.S. Application Data

(60) Provisional application No. 61/036,087, filed on Mar. 13, 2008.

(51) Int. Cl.
*G09G 5/02* (2006.01)
*H04N 9/77* (2006.01)

(52) U.S. Cl. ........................................ 345/589; 348/712

(58) Field of Classification Search ........................ None
See application file for complete search history.

(56) References Cited

U.S. PATENT DOCUMENTS

| | | | |
|---|---|---|---|
| 4,064,530 A | 12/1977 | Kaiser et al. | |
| 4,695,885 A | 9/1987 | Kim | |
| 5,387,921 A | 2/1995 | Zhang et al. | |
| 5,717,978 A | 2/1998 | Mestha | |
| 6,127,783 A | 10/2000 | Pashley et al. | |
| 6,194,839 B1 | 2/2001 | Chang | |
| 6,201,353 B1 | 3/2001 | Chang et al. | |
| 6,373,964 B1 | 4/2002 | Geissler et al. | |
| 6,411,046 B1 | 6/2002 | Muthu | |
| 6,441,558 B1 | 8/2002 | Muthu | |
| 6,448,550 B1 * | 9/2002 | Nishimura | 250/226 |
| 6,521,879 B1 | 2/2003 | Rand et al. | |
| 6,576,881 B2 | 6/2003 | Muthu | |
| 6,611,249 B1 | 8/2003 | Evanicky et al. | |
| 6,624,847 B1 | 9/2003 | Abdellatif | |

(Continued)

FOREIGN PATENT DOCUMENTS

| | | |
|---|---|---|
| EP | 1708164 A2 | 3/2006 |
| WO | 02/080625 A1 | 10/2002 |

(Continued)

OTHER PUBLICATIONS

International Search Report issued Sep. 15, 2009 by European Patent Office for Parallel Case PCT/IL2009/000261.

(Continued)

*Primary Examiner* — Joni Richer
*Assistant Examiner* — Michelle Chin
(74) *Attorney, Agent, or Firm* — Simon Kahn

(57) ABSTRACT

A color controller for a luminaire constituted of: a thru-converter operative to convert an input signal to at least one luminaire drive signal; an illumination sampler arranged to sample an output from the luminaire and generate a representation thereof; and a feedback controller arranged to receive the output representation and generate the updatable conversion factor in cooperation with calibration luminance and color values, wherein the thru-converter operation is responsive to a trigger signal for defining a first and a second mode, the first mode for generating the luminaire drive signal for the luminaire responsive to the input signal being a frame luminance signal and target color signals and wherein the conversion to the at least one luminaire drive signal is responsive to an updatable conversion factor, and the second mode for generating the luminaire drive signal for the luminaire responsive to the feedback controller.

30 Claims, 11 Drawing Sheets

U.S. PATENT DOCUMENTS

| | | | |
|---|---|---|---|
| 6,870,525 B2 | 3/2005 | Kawabata et al. | |
| 6,894,442 B1 | 5/2005 | Lim et al. | |
| 6,930,737 B2 | 8/2005 | Weindorf et al. | |
| 7,001,059 B2 | 2/2006 | Han et al. | |
| 7,176,438 B2 | 2/2007 | Bamji et al. | |
| 7,255,462 B2 | 8/2007 | Tseng | |
| 7,315,288 B2 | 1/2008 | Livingston et al. | |
| 7,348,949 B2 | 3/2008 | Lee et al. | |
| 2001/0035853 A1 | 11/2001 | Hoelen et al. | |
| 2004/0135522 A1 | 7/2004 | Berman et al. | |
| 2005/0212459 A1 | 9/2005 | Patel et al. | |
| 2005/0231127 A1 | 10/2005 | Yamamoto et al. | |
| 2005/0231459 A1 | 10/2005 | Furukawa | |
| 2006/0038769 A1 | 2/2006 | Marra et al. | |
| 2006/0050529 A1 | 3/2006 | Chou et al. | |
| 2006/0108933 A1 | 5/2006 | Chen | |
| 2006/0132423 A1 | 6/2006 | Travis | |
| 2006/0187181 A1 | 8/2006 | Kim | |
| 2006/0221047 A1 | 10/2006 | Tanizoe et al. | |
| 2006/0244508 A1 | 11/2006 | Zheng et al. | |
| 2007/0040512 A1 | 2/2007 | Jungwirth et al. | |
| 2007/0046485 A1 | 3/2007 | Grootes et al. | |
| 2007/0063961 A1 | 3/2007 | Kuroki | |
| 2007/0115228 A1 | 5/2007 | Roberts et al. | |
| 2007/0182701 A1 | 8/2007 | Kim et al. | |
| 2008/0018267 A1 | 1/2008 | Arakawa et al. | |
| 2008/0204382 A1* | 8/2008 | Lim et al. | 345/83 |

FOREIGN PATENT DOCUMENTS

| | | |
|---|---|---|
| WO | 2004084170 A1 | 9/2004 |
| WO | 2005111976 A1 | 11/2005 |
| WO | 2006005033 A2 | 1/2006 |
| WO | 2006070323 A1 | 7/2006 |

OTHER PUBLICATIONS

Written Opinion of the ISA issued Sep. 15, 2009 by European Patent Office for Parallel Case PCT/IL2009/000261.

Perduijn et al; “Light Output Feedback Solution for RGB LED Backlight Application”; SID 00 Digest; 2000; pp. 1-3; The Society for Information Display, San Jose, California.

Perduijn et al; “Light Output Feedback Solution for RGB LED Backlight Application”; SID 03 Digest; 2003; pp. 1254-1256; The Society for Information Display, San Jose, California.

Chen et al; “LED Back-Light Driving System for LCD Panels”; Applied Power Electronics Conference and Exposition; Published Mar. 19-23, 2006; IEEE New York.

Li, Perry Y. and Dianat, Sohail A.; “Robust Stabilization of Tone Reproduction Curves for the Xerographic Printing Process”; IEEE Transaction on Control Systems Technology, vol. 9, No. 2, Mar. 2001; pp. 407-415; published IEEE, New York.

Li, Perry Y. and Dianat, Sohail A., “Robust Stabilization of Tone Reproduction Curves for the Xerographic Printing Process”; 1998 IEEE Conference on Control Applications; Sept., Trieste , 1998; published IEEE, New York.

* cited by examiner

COLOR CONTROLLER FOR A LUMINAIRE

CROSS-REFERENCE TO RELATED APPLICATIONS

This application claims priority from U.S. Provisional Patent Application Ser. No. 61/036,087 filed Mar. 13, 2008, entitled "A Color Controller for a Luminaire", the entire contents of which is incorporated herein by reference.

FIELD OF THE INVENTION

The present invention generally relates to the field of lighting and more particularly to a color controller for a luminaire suitable for use with a matrix display exhibiting time varying input signals.

BACKGROUND OF THE INVENTION

LEDs with an overall high luminance are useful in backlighting for Liquid Crystal Display (LCD) based monitors and televisions, collectively hereinafter referred to as a matrix display. In a large LCD matrix display, typically, the LEDs are supplied in one or more strings of serially connected LEDs, thus sharing a common current. Matrix displays typically display the image as a series of frames, with the information for the display being drawn from left to right in a series of descending lines during the frame.

In order to supply a white backlight for the matrix display one of two basic techniques are commonly used. In a first technique one or more strings of "white" LEDs are utilized as a luminaire, the white LEDs typically comprising a blue LED with a phosphor, which absorbs the blue light emitted by the LED to emit a white light. In a second technique one or more individual strings of colored LEDs, functioning as a luminaire, are placed in proximity so that in combination their light is seen as white light. Often, two strings of green LEDs are utilized to balance one string each of red and blue LEDs. Each of the colored LED strings is typically intensity-controlled by Pulse Width Modulation (PWM) to achieve an overall fixed perceived luminance and white point balance. The current, when pulsed on, is held constant to maintain the white point among the disparate colored LED strings, and the PWM duty cycle is controlled to dim or brighten the backlight by adjusting the average current.

Overall luminance is controlled by changing the PWM duty cycle of each color multiplied by a common factor while the white balance point is maintained by the proportion between the three color PWM duty cycle signals. It is to be noted that different colored LEDs age, or reduce their luminance as a function of current, at different rates and thus the PWM duty cycle of each color must be modified over time to maintain the initial white point.

The colored LEDs also change their output as a function of temperature. The LED changes are corrected by adjusting the respective PWM duty cycles with a color loop controller. It is to be noted that changes to the color LED output are relatively slow, particularly as compared to frame time.

A known problem of LCD matrix displays is reduced contrast caused by light leakage through the orthogonal polarizers of the LCD display, particularly in the presence of ambient light. This problem is addressed by adding dynamic capability to the backlight. The dynamic capability adjusts the overall luminance of the backlight for each zone responsive to the current video signal, typically calculated by a video processor. Thus, in the event of a dark scene, the backlight luminance is reduced thereby improving the contrast. Since the luminance of a scene may change on a frame by frame basis, the luminance is preferably set on a frame by frame basis, responsive to the video processor. It is to be noted that a new frame begins every 16.7-20 milliseconds, depending on the system used.

An article by Perduijn et al, entitled "Light Output Feedback Solution for RGB LED Backlight Applications, published as part of the SID 03 Digest, by the Society for Information Display, San Jose, Calif., ISSN/0003-0996X/3/3403-1254, the entire contents of which is incorporated herein by reference, is addressed to a backlighting system utilizing RGB LED light sources, a color sensor and feedback controller operative to maintain color stability over temperature fluctuations. Optionally, brightness can be maintained constant. Brightness, or luminance, control is accomplished by comparing the luminance sensed output of the LEDs with a luminance set point. The difference is fed to a PI compensator duty control whose output is multiplied with the input set points, and the loop is closed via the color control loop. Unfortunately, in the instance of a dynamic backlight as described above, use of the color control loop to control luminance requires a high speed color loop, because the luminance may change from frame to frame. Such a high speed color loop adds to the cost.

U.S. Patent Application Publication S/N 2006/0221047 A1 in the name of Tanizoe et al, published Oct. 5, 2006 and entitled "Liquid Crystal Display Device", the entire contents of which is incorporated herein by reference, is addressed to a liquid crystal display device capable of shortening the time required for stabilizing the brightness and chromaticity in response to a temperature change. A brightness setting means is multiplied with a color setting means prior to feedback to a comparison means, and thus a single feedback loop controls both brightness and color. Unfortunately, in the instance of dynamic backlight, use of the color control loop to control luminance requires a high-speed color loop, because the luminance may change from frame to frame, thus adding to the cost.

What is needed, and not provided by the prior art, is a color controller for a luminaire whose target luminance and/or color may vary on a frame to frame basis, without requiring a high speed color control loop.

SUMMARY OF THE INVENTION

Accordingly, it is a principal object of the present invention to overcome the disadvantages of prior art. In one embodiment this is provided for by a color controller for a luminaire. The color controller exhibits a thru-converter operative to convert time varying frame luminance and target color signals to at least one luminaire drive signal, the conversion being responsive to an updatable conversion factor. Responsive to a trigger signal, the thru-converter generates the luminaire drive signal responsive to a feedback loop controller which is operative in cooperation with calibration luminance and color values. An illumination sampler is further provided, thereby closing the color loop for the feedback loop controller. The feedback loop controller determines an updated conversion factor which is then fed to the thru-converter for use with the time varying frame luminance and target color signals.

In one embodiment the trigger signal is periodic, and in another embodiment the trigger signal is dependent on the time varying frame luminance and target color signals. In one particular embodiment the luminaire drive signal is a PWM drive signal exhibiting a period, and the thru-converter generates the luminaire drive signal responsive to the feedback loop controller for a single PWM cycle responsive to the trigger signal.

In one embodiment the invention provides for a color controller for a luminaire, the color controller comprising: a thru-converter operative to convert an input signal to at least one luminaire drive signal; an illumination sampler arranged to sample an output from the luminaire and generate a representation thereof; and a feedback controller arranged to receive the output representation and generate an updatable conversion factor in cooperation with calibration luminance and color values, wherein the thru-converter operation is responsive to a trigger signal for defining a first and a second mode, the first mode for generating the luminaire drive signal for the luminaire responsive to the input signal being a frame luminance signal and target color signals and wherein the conversion to the at least one luminaire drive signal is responsive to an updatable conversion factor, and the second mode for generating the luminaire drive signal for the luminaire responsive to the feedback controller.

In one further embodiment the color loop controller further comprises a correction factor calculator responsive to the feedback controller and operative to calculate an updated conversion factor for the thru-converter. In another further embodiment the illumination sampler comprises an RGB color sensor and an integrator.

In one further embodiment the illumination sampler comprises an RGB color sensor, an integrator, an analog to digital converter and a color conversion matrix, the analog to digital converter being responsive to the trigger signal. In another further embodiment the second mode is maintained for the illumination period of a full frame.

In one further embodiment the second mode is maintained for less than the illumination period of a full frame. In another further embodiment the luminaire drive signal is constituted of a pulse width modulated signal exhibiting a cycle period, wherein a frame exhibits a plurality of pulse width modulated signal cycles, and wherein the second mode is maintained for a single cycle period of the frame. In one yet further embodiment, the color loop controller further comprises a compensation processor in communication with the feedback controller and operative to generate a compensating luminance signal and compensating target color signals for the remaining pulse width modulated signal cycles of the frame, and wherein the thru-converter operation is responsive to the trigger signal for defining a third mode for generating the luminaire drive signal for the luminaire responsive to the compensating luminance signal and compensating target color signals. Preferably, the compensating luminance signal and compensating target color signals are determined responsive to the frame luminance signal and target color signals and to the feedback controller.

In one yet further embodiment, the feedback controller is arranged to converge over a plurality of single cycle periods of disparate frames. In another yet further embodiment a trigger generator is arranged to receive a temperature indication of the luminaire, and wherein in the event that the temperature indication is stable over time the second mode is maintained for the single cycle period, and in the event that the temperature indication is not stable over time the second mode is maintained for the full frame.

In one further embodiment the trigger signal is periodic. In another further embodiment the target color signals are frame variable. In yet another further embodiment, the color loop controller further comprises a trigger generator operative to generate the trigger signal. In one yet further embodiment the feedback controller is responsive to at least one calibration signal, and the trigger generator is operative to: compare at least one of the received frame luminance signal and the target color signals with the at least one calibration signal; and generate, in the event that the compared at least one signal is within a predetermined range of the at least one calibration signal, the trigger signal. In another yet further embodiment the trigger generator is operative to generate the trigger signal responsive to a received signal indicative of a black frame.

In one embodiment the invention provides for a method of color control for a luminaire, the method comprising: converting a frame luminance signal and target color signal, responsive to an updatable conversion factor, to a first luminaire drive signal; generating, responsive to a trigger signal, a second luminaire drive signal, the second luminaire drive signal being responsive to calibration luminance and color values; sampling an optical output of the luminaire driven responsive to the second luminaire drive signal; generating, responsive to the sampled optical output, a revised conversion factor; and updating the updatable conversion factor with the revised conversion factor.

In one further embodiment, the method further comprises calculating the revised conversion factor. In another further embodiment, the sampling comprises integrating an output of a color sensor over a predetermined time period.

In one further embodiment, the luminaire is driven responsive to the second luminaire drive signal for the illumination period of a full frame. In another further embodiment, the luminaire is driven responsive to the second luminaire drive signal for less than the illumination period of a full frame.

In one further embodiment, the second luminaire drive signal is a pulse width modulated signal exhibiting a duty cycle, and wherein the luminaire is driven responsive to the second luminaire drive signal for only a single cycle period of a frame. In another further embodiment, the method further comprises: generating a third luminance drive signal, the third luminance drive signal responsive to the calibration luminance and color values and to the frame luminance and target color signal; and driving the luminaire for the balance of the frame with the third luminance drive signal. In one yet further embodiment, the generating of the revised conversion factor is over a plurality of frames. In another yet further embodiment, the generating of the revised conversion factor is over a plurality of non-contiguous frames. In yet another yet further embodiment, the trigger signal is responsive to a temperature indication of the luminaire, and the luminaire is driven responsive to the second luminaire drive signal for only a single cycle period of a frame only in the event that the temperature indication is stable over time.

In one further embodiment the trigger signal is periodic. In another further embodiment the target color signal may vary from frame to frame. In one yet further embodiment, the method further comprises: comparing at least one of the received frame luminance signal and the target color signals with at least one of the calibration luminance and color values; and generating, in the event that the compared signal is within a predetermined range of the value, the trigger signal. In yet another further embodiment, the method further comprises generating a trigger signal responsive to a received signal indicative of a black frame.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

The present embodiments enable a color controller for a luminaire. The color controller exhibits a thru-converter operative to convert time varying frame luminance and target color signals to at least one luminaire drive signal, the conversion being responsive to an updatable conversion factor. Responsive to a trigger signal, the thru-converter generates the luminaire drive signal responsive to a feedback loop controller which is operative in cooperation with calibration luminance and color values. An illumination sampler is further provided, thereby closing the color loop for the feedback loop controller. The feedback loop controller determines an updated conversion factor which is then fed to the thru-converter for use with the time varying frame luminance and target color signals.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

The embodiments of the invention disclosed herein are the best modes contemplated by the inventors for carrying out their invention in a commercial environment, although it should be understood that various modifications could be accomplished within the parameters of the present invention.

Figure 1A:
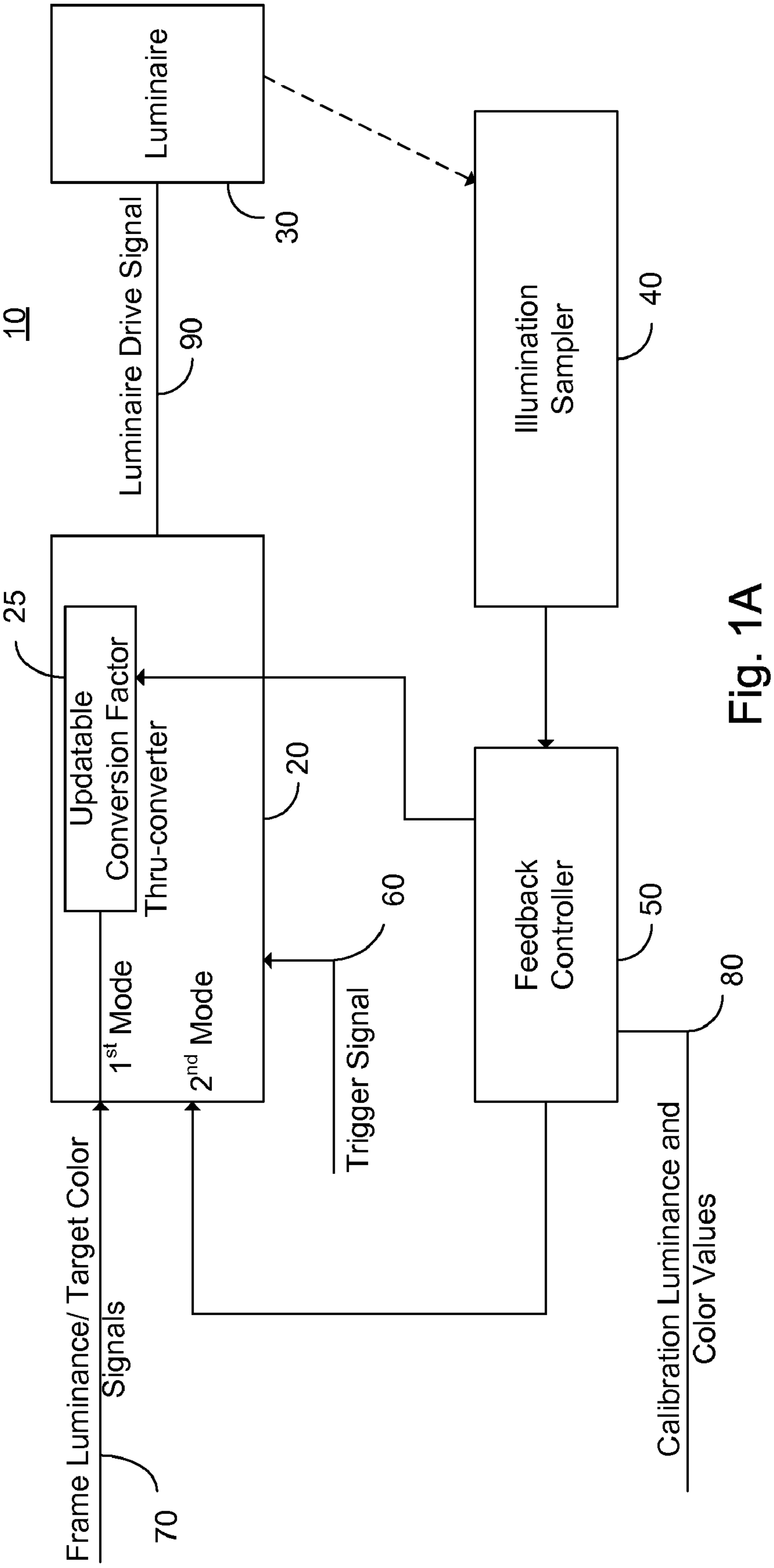
FIG. 1A illustrates a high level block diagram of an embodiment of a color controller for a luminaire in accordance with certain embodiments of the current invention.

FIG. 1A illustrates a high level block diagram of an embodiment of a color controller 10 for a luminaire in accordance with certain embodiment of the current invention, comprising: a thru-converter 20 comprising an updatable conversion factor 25; a luminaire 30; an illumination sampler 40; a feedback controller 50; a trigger signal 60; frame luminance and target color signals 70; and calibration luminance and color values 80. Frame luminance and target color signals 70 are received at a $1^{st}$ mode input of thru-converter 20. Thru-converter 20 outputs a luminaire drive signal 90 which is connected to luminaire 30. Illumination sampler 40 is arranged to receive an optical sample of the output of luminaire 30. The output of illumination sampler 40 is connected to an input of feedback controller 50. Feedback controller 50 further receives a respective input calibration luminance and color values 80. One output of feedback controller 50 is connected to the updating input of updatable conversion factor 25. A second output of feedback controller 50 is connected to the $2^{nd}$ mode input of thru-converter 20.

In operation, thru-converter 20 exhibits 2 modes of operation. In a first mode, frame luminance and target color signals 70 are converted responsive to updatable conversion factor 25 to luminaire drive signal 90. In one embodiment luminaire drive signal 90 is constituted of a plurality of signals driving luminaire 30, which in one embodiment comprises strings of red, blue and green LEDs arranged to be optically mixed to a single color. Responsive to trigger signal 60, thru-converter 20 switches to a second mode, in which luminaire drive signal 90 is generated responsive to feedback controller 50. The output of luminaire 30 is sampled by illumination sampler 40 in the second mode. The output of illumination sampler 40 is input to feedback controller 50. In one embodiment the output of illumination sampler 40 from an instance of the second mode is reflected in a subsequent instance of the second mode.

Figure 1B:
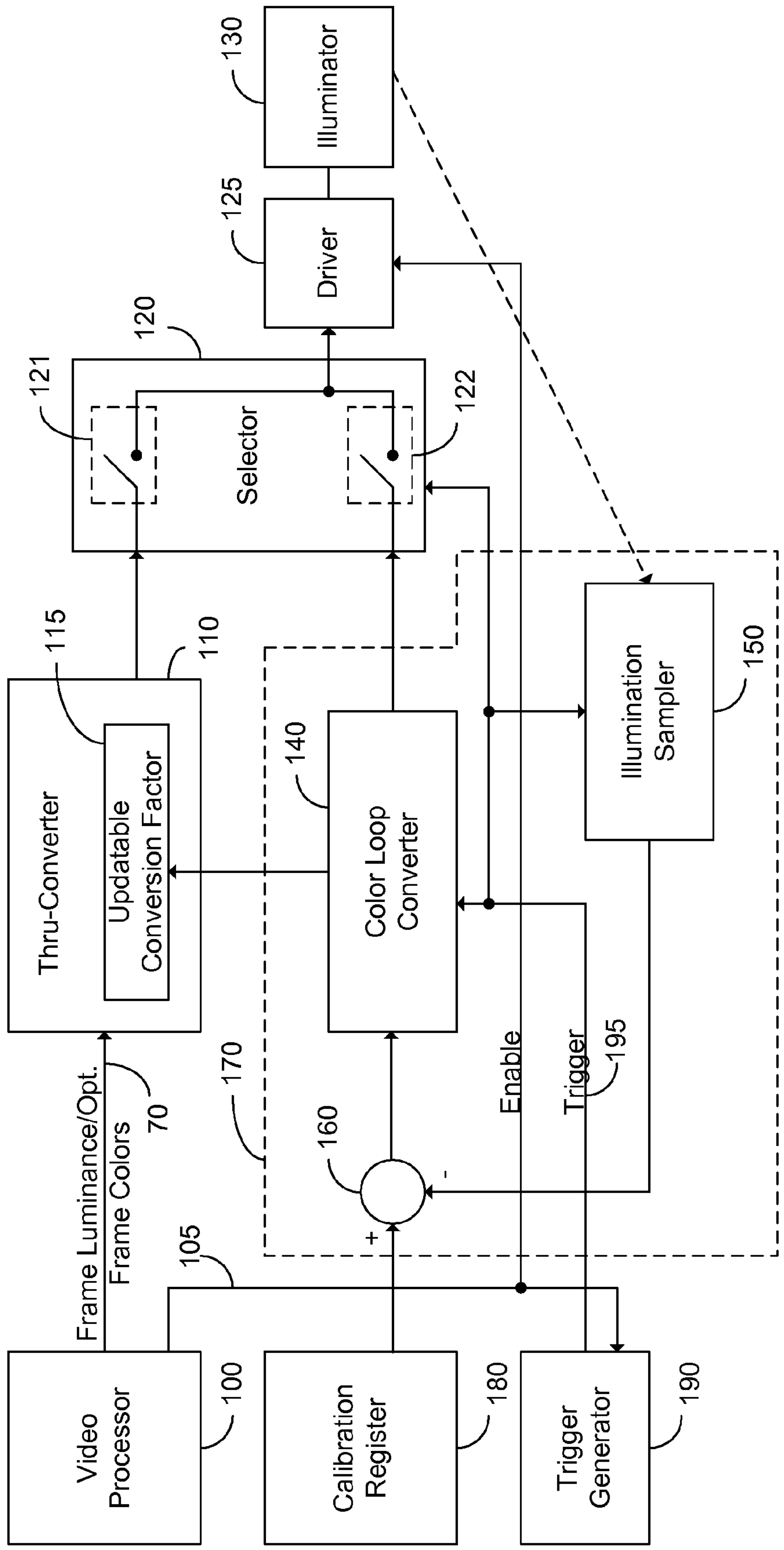
FIG. 1B illustrates a high level block diagram of an LCD illumination system according to certain embodiments of the invention.

FIG. 1B illustrates a high level block diagram of an LCD illumination system according to an embodiment of the invention, the LCD illumination system comprising: a video processor 100; a thru-converter 110 comprising an updatable conversion factor 115; a selector 120 comprising a thru-converter switch 121 and a color loop controller switch 122; a driver 125; an illuminator 130; a color loop controller 170 comprising a color loop converter 140, an illumination sampler 150 and a color loop error generator 160; a calibration register 180; and a trigger generator 190. The combination of driver 125 and illuminator 130 represent an embodiment of luminaire 30 of FIG. 1A. The combination of color-loop converter 140 and color loop error generator 160 represents a particular embodiment of feedback controller 50 of FIG. 1A.

An output of video processor 100 comprising a frame luminance signal 70 and optionally frame color values is connected to an input of thru-converter 110. In one embodiment frame luminance signal 70 is an analog signal representing a dimming value. In another embodiment, frame luminance signal 70 is an analog signal representing a boosting value. In yet another embodiment, frame luminance signal 70 is a digital signal representing desired luminance.

An enable output 105 of video processor 100 is connected to an input of trigger generator 190 and to the enable input of driver 125. The output of thru-converter 110 is connected via thru-converter switch 121 to driver 125, and the output of driver 125 is connected to the input of illuminator 130. The output of illuminator 130 is optically connected to illumination sampler 150, and the output of illumination sampler 150 is connected to the negative input of color loop error generator 160. The output of color loop error generator 160 is connected to the input of color loop converter 140, and a first output of color loop converter 140 is connected via color loop controller switch 122 to driver 125. A second output of color loop converter 140 is connected to the input of updatable conversion factor 115 of thru-converter 110. The output of trigger generator 190, denoted as a trigger signal 195, is connected to the trigger input of illumination sampler 150, the stepping input of color loop converter 140 and the control input of selector 120. The output of calibration register 180 is connected to the positive input of color loop error generator 160 and the error signal output of color loop error generator 160 is fed to an input of color loop converter 140.

The system of FIG. 1B represents a single illumination zone of a backlight for an LCD matrix display, and thus the luminance frame signal represents the luminance information for a particular zone, and the optional frame color values represent color information for a particular zone. In one embodiment video processor 100 is common to all zones of the LCD matrix display.

In operation, video processor 100 outputs frame luminance signal 70 for each zone, in advance of the enable signal for that zone. Video processor 100 further outputs enable signal 105 for each zone, which turns on driver 125 to cause illumination by illuminator 130 for the zone at the required time period for the frame. Optionally, video processor 100 further outputs frame color values, for each frame, for each zone. In one embodiment, the frame color values are provided consonant with the CIE 1931 color space standard as X, Y, Z values. In another embodiment the frame color values are provided consonant with the CIE LUV color space, in yet another embodiment the frame color values are provided consonant with the CIE LAB color space and in yet another embodiment the frame color values are provided consonant with an RGB color system. In the absence of optional frame color values, fixed color values are supplied by video processor 100, optionally responsive to a user input.

Thru-converter 110 converts the received frame luminance signal 70 and color values, be they fixed or frame variable, to a pulse width modulated signal, responsive to updatable conversion factor 115. The pulse width modulated signal exhibit appropriate duty cycles to generate an output of illuminator 130, via driver 125, consonant with the received frame luminance signal 70 and color value. The value of updatable conversion factor 115 requires updating responsive to aging and temperature dependence of the constituent LEDs of illuminator 130.

Trigger generator 190, responsive to the enable input received from video processor 100, at certain intervals generates trigger signal 195. In one embodiment, trigger generator 190 generates trigger signal 195 at periodic intervals. In another embodiment, trigger generator 190 generates trigger signal 195 responsive to particular values of frame luminance and optionally to particular frame color values. Responsive to trigger signal 195, selector 120 passes control of driver 125 and thus illuminator 130 to the first output of color loop converter 140. Color loop converter 140 further outputs a conversion factor update value via the second output of color loop converter 140, which is forwarded to updatable conversion factor 115. Illumination sampler 150, responsive to the trigger signal of trigger generator 190, samples the output of illuminator 130 which represents the values output by color loop converter 140. In one embodiment illumination sampler 150 comprises an integrator operative to integrate the received illumination over a single PWM cycle of color loop converter 140, and in another embodiment illumination sampler 150 comprises an integrator operative to integrate the received illumination over a predetermined portion of a frame. The predetermined portion may be an entire frame, or the enabled portion of the frame, without exceeding the scope of the invention.

In yet another embodiment, illumination sampler 150 comprises a low pass filter and an analog to digital converter operative to sample an average value of illuminator 130 over a predetermined portion of the frame.

In one embodiment, illumination sampler 150 further comprises a calibration matrix, operative to convert the received sample to a color system consonant with calibration values of calibration register 180.

Color loop error generator 160 receives at its positive input a calibration luminance signal and calibration color values, stored in calibration register 180, and at its negative input the output of illumination sampler 150. Color loop error generator 160 outputs an error signal responsive to the difference between the output of illumination sampler 150 and the calibration luminance signal and calibration color values. Color loop converter 140 is preferably a proportional controller, and further preferably one of a proportional integral differential (PID) controller and a proportional differential (PD) controller, and is operative responsive to the received calibration luminance signal and calibration color values from calibration register 180 and the difference signal received from color loop error generator 160 to output pulse width modulated signal with values directed to converge the output of illumination sampler 150 with the calibration luminance signal and calibration color values, stored in calibration register 180. The correction factor, or difference, between the nominal values associated with the calibration luminance signal and calibration color values and the previous values of the pulse width modulated signal are output via the second output of color loop converter 140 to updatable conversion factor 115. Thus the correction generated by the previous occurrence of the trigger signal is updated to updatable conversion factor 115 of thru-converter 110 at the subsequent trigger.

The switches of signal selector 120 are controlled by trigger signal 195. When the trigger is OFF, selector switch 121 provides the output of thru-converter 110 to driver 125. When the trigger signal is ON, thru-converter switch 121 provides the output signal of color loop converter 140 to driver 125. Thus, at the end of the active portion of trigger signal 195, selector 120 passes control of driver 125 and illuminator 130 to thru-converter 110.

There is no requirement that color loop controller 170 act at frame speeds, since the trigger signal is preferably timed to occur no faster than the speed of color loop controller 170. Changes to the constituent LEDs of illuminator 130 are gradual, and thus slow acting color loop controller 170 may be used to update high speed thru-converter 110. The change in LCD illumination during the trigger ON period is in one embodiment of a single PWM cycle thus unnoticeable to the user.

In one further embodiment, any difference between the values of the frame luminance signal and the optional frame color values are compensated during the balance of the frame, as will be described further below. In another embodiment entire frames are utilized. In yet another embodiment, only frames with values of frame luminance signal 70 and optional frame color values within a predetermined range of the calibration luminance signal and calibration color values are utilized. In yet another embodiment black periods are utilized.

Figure 2:
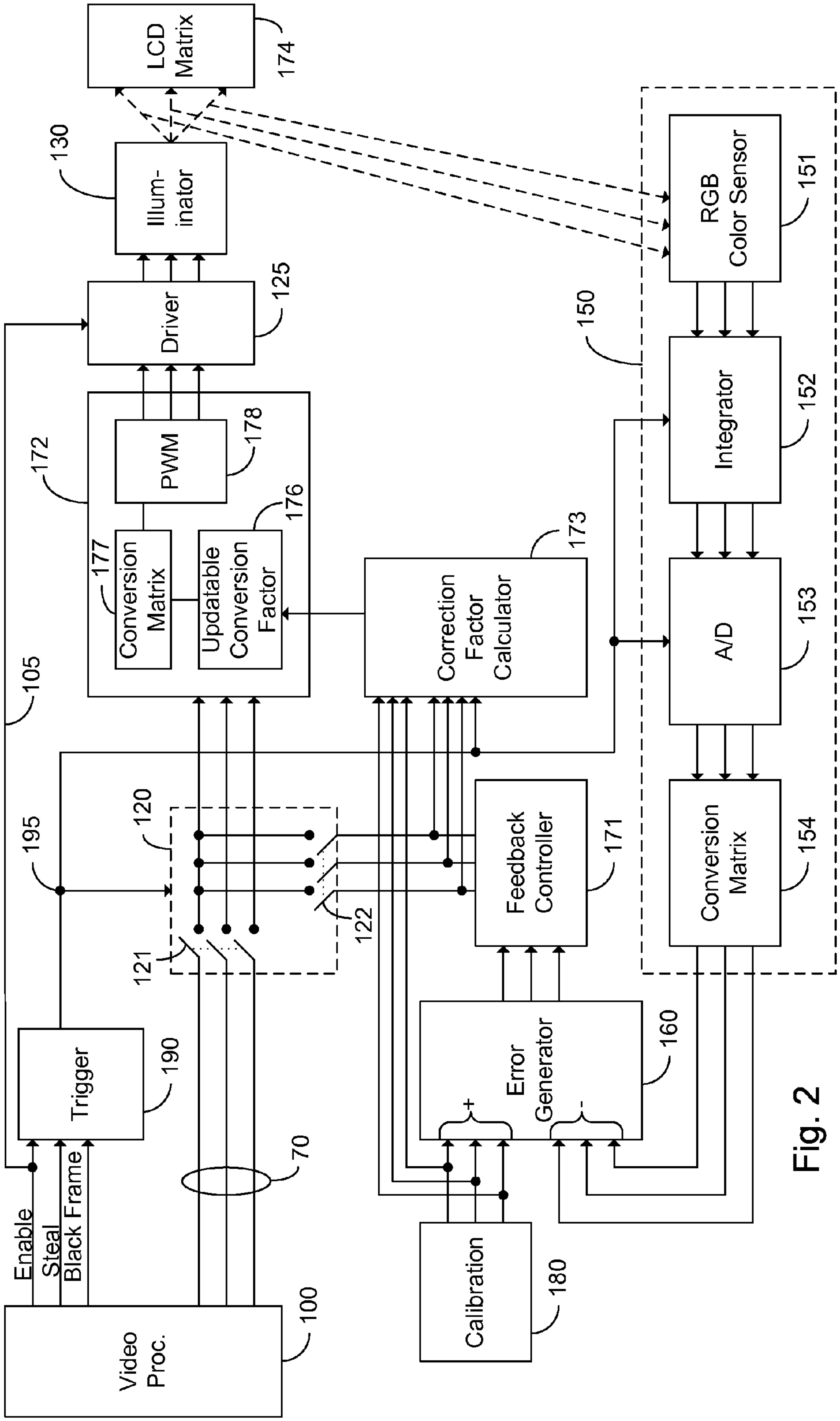
FIG. 2 illustrates a high level block diagram of an embodiment of the LCD illumination system of FIG. 1B, in accordance with certain embodiments of the invention, in which the thru-converter receives one of video processor signals and color loop controller signals associated with the calibration register values.

FIG. 2 illustrates a block diagram of an embodiment of the LCD illumination system of FIG. 1B, in accordance with certain embodiment of the invention, in which a thru-converter 172 receives alternately one of video processor signals and color loop controller signals associated with the calibration register values. The LCD illumination system of FIG. 2 comprises: a video processor 100; a selector 120 comprising a thru-converter switch 121 and a color loop controller switch 122; thru-converter 172 comprising an updatable conversion factor 176, a conversion matrix 177 and a PWM generator 178; a driver 125; an illuminator 130; an LCD matrix 174; an illumination sampler 150 comprising an RGB color sensor 151, an integrator 152, an analog to digital (A/D) converter 153 and a color conversion matrix 154; a color loop error generator 160; a feedback controller 171; a correction factor calculator 173; a calibration register 180; and a trigger generator 190. The LCD illumination system of FIG. 2 differs from the LCD illumination system of FIG. 1B primarily in that selector 120 is placed ahead of thru-converter 172, and thus the output of feedback controller 171 of the LCD illumination system of FIG. 2 is fed via selector 120 to the input of thru-converter 172 and is arranged to be compatible therewith.

A first set of outputs of video processor 100, illustrated as 3 signal lines, and comprising a frame luminance signal 70 and optionally frame color values is connected to an input of thru-converter switch 121. In one embodiment, frame luminance signal 70 is an analog signal representing a dimming value. In another embodiment, frame luminance signal 70 is an analog signal representing a boosting value. In yet another embodiment, frame luminance signal 70 is a digital signal representing desired luminance. In the absence of optional frame color values, fixed color values are output by video processor 100, optionally responsive to a user input.

An output of video processor 100, denoted enable signal 105, is connected to an input of trigger generator 190 and to the enable input of driver 125. Optionally, a black frame signal and/or a steal frame signal are output by video processor and connected to an input of trigger generator 190. The outputs of thru-converter switch 121, when closed, are connected to the input of thru-converter 172. The output of thru-converter 172 is connected to the input of driver 125, and the output of driver 125 is connected to the input of illuminator 130. A portion of the output of illuminator 130 is optically connected to illumination sampler 150, and more particularly to RGB color sensor 151, and a portion is optically connected to LCD matrix 174. Thus, illumination sampler 150 receives light representative of the light experienced by LCD matrix 174.

The outputs of RGB color sensor 151 are connected to the input of integrator 152. The outputs of integrator 152 are connected to the inputs of A/D converter 153. The outputs of A/D converter 153 are connected to the inputs of color conversion matrix 154. The outputs of color conversion matrix 154 are connected to a first set of inputs of color loop error generator 160, representing the negative inputs thereof. The outputs of calibration register 180 are connected both to a second set of inputs of color loop error generator 160, representing the positive inputs thereof, and to a first set of inputs of correction factor calculator 173. The outputs of color loop error generator 160 are connected to the inputs of feedback controller 171, and the outputs of feedback controller 171 are connected both to a second set of inputs of conversion factor calculator 173 and to the inputs of color loop controller switch 122. The outputs of color loop controller switch 122, when closed, are connected to the input of thru-converter 172. The output of correction factor calculator 173 is forwarded to updatable conversion factor 176 of thru-converter 172.

The output of trigger generator 190, denoted trigger signal 195, is connected to the trigger input of A/D converter 153 of illumination sampler 150, the trigger input of integrator 152, the stepping/gating input of correction factor calculator 173, the control input of selector 120 and optionally (not shown) to a stepping input of feedback controller 171.

The system of FIG. 2 represents a single illumination zone of a backlight for an LCD matrix display, and thus luminance frame signal 70 and optionally the frame color values represent luminance and optionally color information for a particular zone. In one embodiment video processor 100 is common to all zones of LCD matrix display 174.

In operation, video processor 100 outputs luminance frame signal 70 for each zone, in advance of the enable signal for that zone. Video processor 100 further outputs enable signal 105 for each zone, which turns on driver 125 to cause illumination by illuminator 130 of LCD matrix 174 for the zone at the required time period for the frame. Optionally, video processor 100 further outputs frame color values, for each frame, for each zone. In one embodiment the frame color values are provided consonant with the CIE 1931 color space standard as X, Y, Z values. In another embodiment the frame color values are provided consonant with the CIE LUV color space, in yet another embodiment the frame color values are provided consonant with the CIE LAB color space and in yet another embodiment the frame color values are provided consonant with a RGB color system. In the absence of optional frame color values, fixed color values are supplied by video processor 100, optionally responsive to a user input.

Thru-converter 172 receives, via thru-converter switch 121, frame luminance signal 70 and color values, be they fixed or frame variable. Thru-converter 172 modifies the received values by the contents of updatable conversion factor 176, and then transforms the resultant modified value to PWM values via conversion matrix 177. PWM generator 178, responsive to the PWM values output by conversion matrix 177, generates a PWM signal exhibiting appropriate duty cycles. The PWM signal is output by thru-converter 172, to driver 125 which drives illuminator 130 with PWM drive signals consonant with the received frame luminance signal 70 and color value.

Trigger generator 190, responsive to enable signal 105 received from video processor 100, generates trigger signal 195 at certain intervals. In one embodiment, trigger generator 190 generates trigger signal 195 at periodic intervals. In another embodiment, trigger generator 190 generates trigger signal 195 responsive to particular values of frame luminance and optionally to particular frame color values. In yet another embodiment, trigger generator 190 generates trigger signal 195 responsive to a black frame signal received from video processor 100 indicating the LCD matrix 174 is set to black for the current frame. In yet another embodiment, video processor 100 outputs a steal cycle signal, and trigger 190 generates trigger signal 195 responsive to the received steal cycle signal.

Responsive to trigger signal 195, selector 120 removes the output of video processor 100 from the input of thru-converter 172, and forwards the output of feedback controller 171 to the input of thru-converter 172. Feedback controller 171 is preferably a proportional controller, and further preferably one of a proportional integral differential (PID) controller and a proportional differential (PD) controller, and is operative responsive to the received color loop error generator to generate values in a system consonant with the system of the color signals, be they variable or fixed, directed to converge the output of illumination sampler 150 with the calibration luminance signal and calibration color values, stored in calibration register 180.

Correction factor calculator 173, responsive to the values generated by feedback controller 171, and the calibration luminance and color values output by calibration register 180, calculates a correction factor for the current status of the color loop defined by thru-converter 172, driver 125, illuminator 125 and illumination sampler 150. The correction factor calculated by correction factor calculator 173 is forwarded to updatable conversion factor 176 to be used by thru-converter 172 for subsequent through conversion of frame luminance and color values.

RGB color sensor 151, outputs a signal representative of the output of illuminator 130. Integrator 152, cleared responsive to trigger signal 195, integrates the output of RGB color sensor 151 over a predetermined portion of a frame. The predetermined portion may be an entire frame, the enabled portion of the frame, or a particular number of PWM cycles, without exceeding the scope of the invention. A/D converter 153, responsive to trigger signal 195, samples the output of integrator 152 at the end of the predetermined portion of the frame, prior to integrator 152 being cleared. Color conversion matrix 154 is operative to convert the received sample RGB values to values consonant with the color system of calibration register 180.

Color loop error generator 160 receives at its positive input a calibration luminance signal and calibration color values, stored in calibration register 180, and at its negative input the output of color conversion matrix 154. Color loop error generator 160 outputs a difference signal responsive to the difference between the output of color conversion matrix 154 and the calibration luminance signal and calibration color values of calibration register 180.

The switches of signal selector 120 are controlled by trigger signal 195. When the trigger is OFF, selector switch 121 provides thru-converter 172 with frame luminance signal 70 and optional color values. When the trigger signal is ON, thru-converter switch 121 provides thru-converter 172 with the output signal of feedback controller 171.

There is no requirement that feedback controller 171 act at frame speeds, since trigger signal 195 is preferably timed to occur no faster than the speed of feedback controller 171. Changes to the constituent LEDs of illuminator 130 are gradual, and thus slow acting feedback controller 171 may be used to update updatable conversion factor 176 of thru-converter 172. The illumination by illuminator 130 during the trigger ON period is in one embodiment of a single PWM cycle, and the difference in values between the output of feedback controller 171 and the frame luminance signal 70 is thus unnoticeable to the user. In one further embodiment, any difference between the values of frame luminance signal 70 and the optional frame color values are compensated during the balance of the frame, as will be described further hereinto below. In another embodiment entire frames are utilized by feedback controller 171. In yet another embodiment, only frames with values of frame luminance signal 70 and optional frame color values within a predetermined range of the calibration luminance signal and calibration color values of calibration register 180 are utilized. In yet another embodiment black periods are utilized as indicated by the black frame signal output by video processor 100.

Thus, a conversion factor update is carried out responsive to trigger signal 195 output by trigger generator 190. Trigger signal 195 sets off a video frame or a 'cycle stealing' period, during which, selector switches 121, 122 change state and the output signals of feedback controller 171 are directed to PWM modulator 178. RGB color sensor 151 detects a sample of the illumination during the 'cycle stealing' period. The output of RGB color sensor 151 is integrated by integrator 152 and sampled by A/D converter 153. The output of A/D converter 153 is converted by color conversion matrix 154 to an appropriate color space model consonant with the color system of the contents of calibration register 180. After the calibration frame or 'cycle stealing' period, updatable conversion factor 176 is updated by correction factor calculator 173, thru-converter 172 returns to routine operation.

Figure 3:
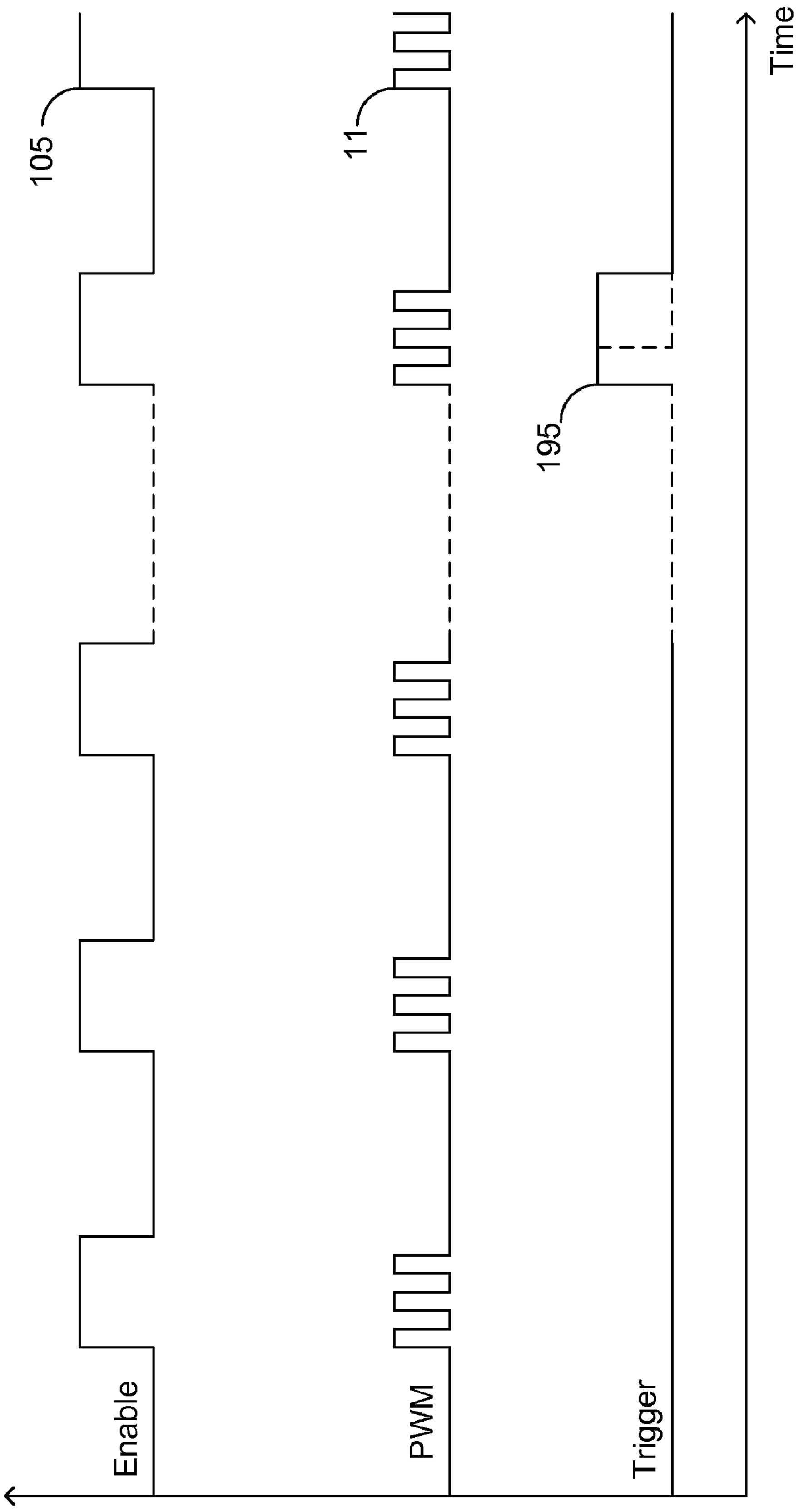
FIG. 3 illustrates certain signal waveforms of the illumination system of FIGS. 1, 2 according to certain embodiments of the present invention.

Reference is now made to FIG. 3, which illustrates certain signal waveforms of the illumination system of FIGS. 1, 2 according to an embodiment of the present invention, in which the y-axis indicates signal amplitude for each signal and the x-axis indicates a common time base. Enable signal 105 is output by video processor 100 to enable driver 125 to illuminate illuminator 130 for a portion of a video frame. Pulses 11 of the PWM signal include several consecutive pulses at the output of driver 125, generated by PWM generator 178 of FIG. 2, and thru-converter 110 of FIG. 1, respectively. Pulses produced by PWM generator 178 and thru-converter 110, respectively, are logically ANDed with enable signal 105, and thus for each active portion of enable signal 105 of a frame, a plurality of PWM pulses 11 are exhibited. Trigger signal 195 is generated at certain times, responsive to enable signal 105, and operative to initiate a calibration event thereby updating updatable conversion factor 25, 115 and 176, respectively, and sampling the respective outputs of luminaire 30 and illuminator 130. When trigger signal 195 is low, the system operates regularly driving LEDs in an open loop mode and bypassing feedback controller 50, color loop controller 170 and feedback controller 171, respectively. The time periods between consecutive events of trigger signal 195 may be constant or variable. In one embodiment trigger signal 195 is active when required illumination as indicated by frame luminance signal 70 is within a predetermined range of the calibration values held in calibration register 180. In another embodiment, trigger signal 195 is active when video processor 100 indicates that a black frame is displayed on LCD matrix 174. In yet another embodiment a combination of the above operational conditions are utilized. Trigger signal 195 may be of a short duration, such as one or more PWM cycles, or occupy the entire active portion of a frame, as indicated by enable signal 105, without exceeding the scope of the invention.

Figure 4:
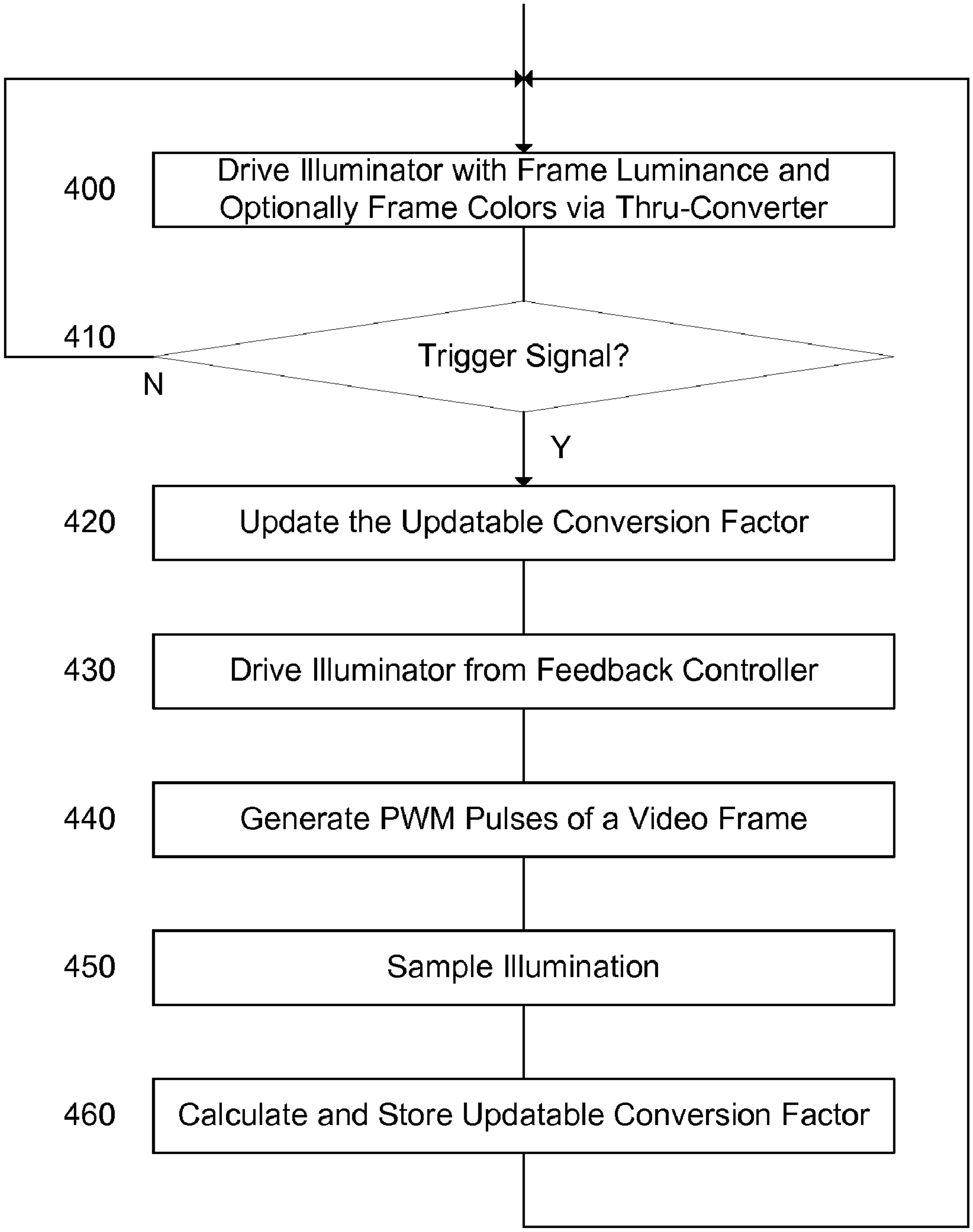
FIG. 4 illustrates a high level flow chart of the illumination method, according to certain embodiments of the present invention, utilizing all illumination driving pulses of a frame for calibrating the conversion coefficient.

Reference is now made to FIG. 4, which illustrates a high level flow chart of the illumination method, according to an embodiment of the present invention, utilizing all illumination driving pulses of a frame for determining updatable conversion factor 25, 115, 176, respectively. In stage 400, the illuminator is driven with frame luminance signals, and optionally with frame color signals, via thru-converter 20, 110, 172 of FIGS. 1A, 1B and 2, respectively. In stage 410 trigger signal 60, 195, respectively, is monitored. In the event that in stage 410 trigger signal 60, 195, respectively, is not detected, stage 400 as described above is repeated. In the event that in stage 410 trigger signal 60, 195, respectively, is detected, in stage 420 the method enters the calibration portion of the process, and in particular the conversion factor of the thru-converter is updated. In stage 430, luminaire 30 or illuminator 130, respectively, is driven responsive to feedback controller 50, color loop controller 170, or feedback controller 171, respectively. In stage 440, the enabled PWM pulses of an entire video frame are driven responsive to feedback controller 50, color loop controller 170, or feedback controller 171, respectively. In stage 450, the illumination as a result of stage 440 is sampled by illumination sampler 40, 150, respectively. In stage 460, the conversion factor for the next instance of stage 410 is calculated and stored, to be updated by the next instance of stage 420. Stage 400, as described above, is then repeated.

The method of FIG. 4 thus "steals" an entire frame, and performs calibration of thru-converter 20, 110, 172 of FIGS. 1A, 1B and 2, respectively, on certain frames. Occasional frames exhibiting luminance and/or color signals not consonant with frame luminance signal 70 are not considered major detriments. Advantageously, the use of an entire frame allows for convergence of feedback controller 50, color loop converter 140, or feedback controller 171, respectively.

Figure 5:
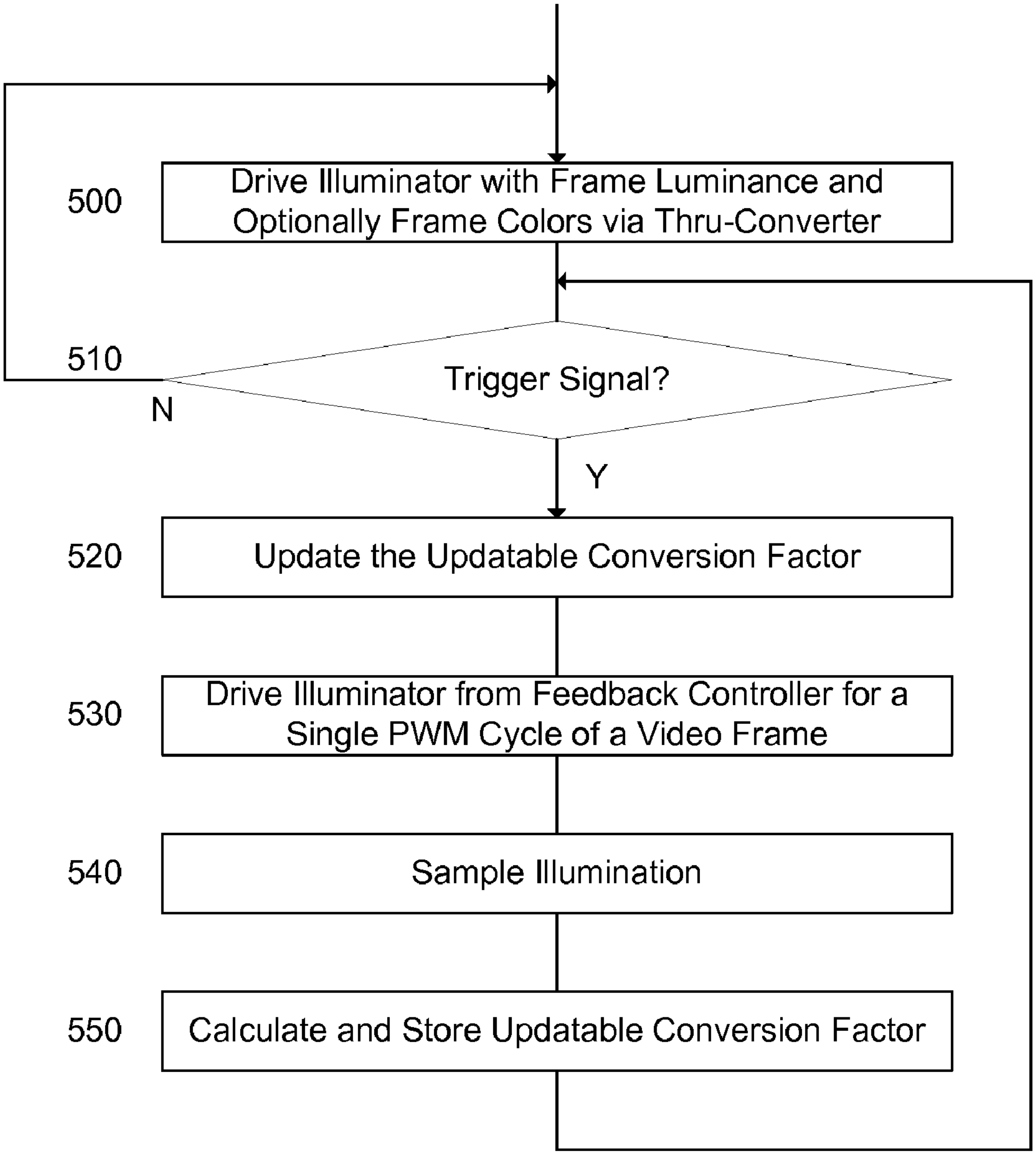
FIG. 5 illustrates a high level flow chart of the illumination method, according to certain embodiments of the present invention, utilizing a particular illumination driving pulse of a frame for calibrating the conversion coefficient.

Reference is now made to FIG. 5, which illustrates a high level flow chart of the illumination method, according to an embodiment of the present invention, utilizing a particular illumination driving pulse of a frame for determining updatable conversion factor 25, 115, 176, respectively. In stage 500, the illuminator is driven with frame luminance signals, and optionally with frame color signals, via thru-converter 20, 110, 172 of FIGS. 1A, 1B and 2, respectively. In stage 510, trigger signal 60, 195 respectively, is monitored. In the event that in stage 510 trigger signal 60, 195, respectively, is not detected, stage 500 as described above is repeated. In the event that in stage 510 trigger signal 60, 195, respectively, is detected, in stage 520 the method enters the calibration portion of the process, and in particular the conversion factor of the thru-converter is updated. In stage 530, luminaire 30 or illuminator 130, respectively, is driven responsive to feedback controller 50, color loop controller 170, or feedback controller 171, respectively for a single PWM cycle of the enabled portion of the frame. In stage 540, the illumination as a result of stage 530 is sampled by illumination sampler 40, 150, respectively. In stage 550, the conversion factor for the next instance of stage 510 is calculated and stored, to be updated by the next instance of stage 520. Stage 500, as described above, is then repeated.

The method of FIG. 5 thus "steals" a single PWM cycle from an entire frame, and performs calibration thru-converter 20, 110, 172 of FIGS. 1A, 1B and 2, respectively, based on stolen cycles. Occasional PWM cycles, exhibiting luminance and/or color signals not consonant with frame luminance signal 70 are not considered major detriments, and are typically invisible to an average viewer. Convergence of feedback controller 50, color loop converter 140 and feedback controller 171, respectively, thus requires a plurality of stolen PWM cycles, at intervals selected by trigger generator 190.

The above has been explained in an embodiment in which a single PWM cycle is "stolen" however this is not meant to be limiting in any way. In another embodiment, 2 or more PWM cycles of a particular frame are stolen without exceeding the scope of the invention.

Figure 6:
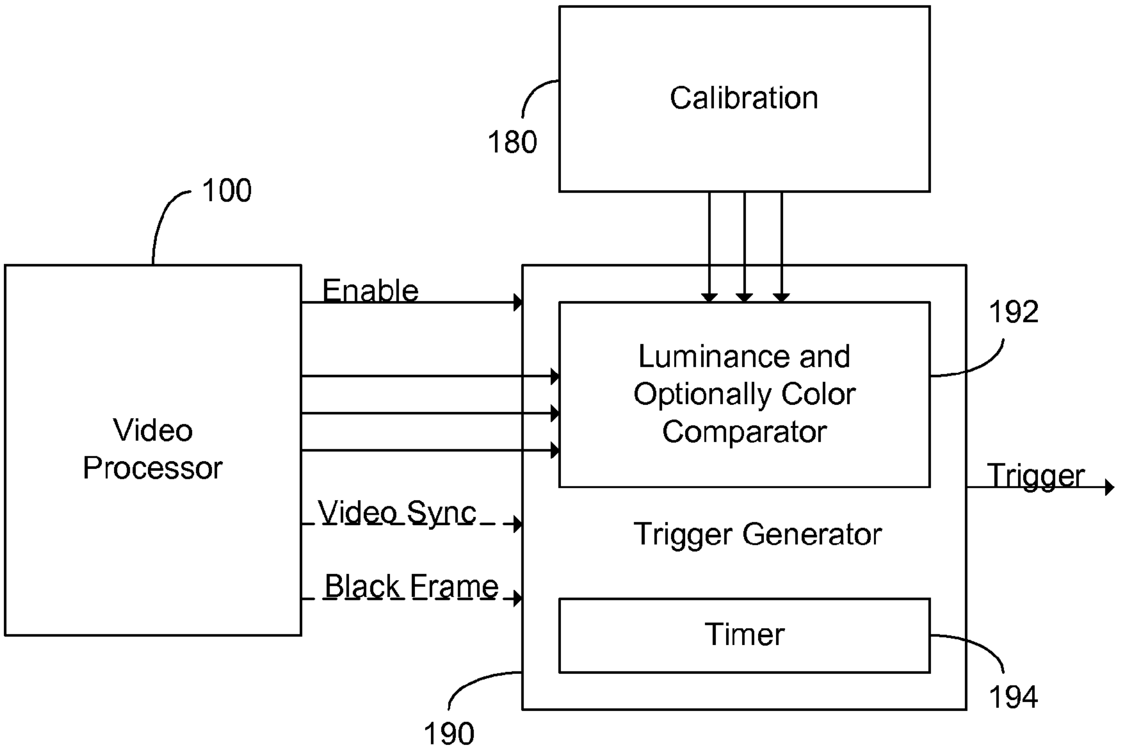
FIG. 6 illustrates a high level block diagram of an embodiment of the trigger generator of FIGS. 1A, 1B and 2, according to certain embodiments of the present invention.

FIG. 6 illustrates a high level block diagram of an embodiment of trigger generator 190 of FIGS. 1B, 2 comprising: a luminance and optionally color comparator 192 and a timer 194. Additionally, video processor 100 and calibration register 180 are shown. In one embodiment, the trigger signal is generated periodically, i.e. at fixed intervals. In another embodiment the intervals between consecutive trigger pulses are variable according to predetermined criteria. In particular, in one embodiment comparator 192 compares luminance signal 70 and optional color signals of video processor 100 with predetermined luminance and color output of calibration register 180. In one embodiment, in the event that the difference is below a predetermined level, a trigger signal is generated.

In one embodiment, video processor 100 provides a black frame signal, which is optionally used by trigger generator 190 to generate a trigger pulse during a black frame signal, thus minimizing the visual effect of the calibration level luminance and/or color since LCD matrix 174 is arranged to maximally block the transmission of light from illuminator 130 during black frames. Timer 194 is used to generate a trigger signal after a predetermined maximum time period when no other criteria are met during this maximum time period. Video processor 100 additionally provides enable signal 105 and optionally a video sync signal so as to synchronize the operation of trigger generator 190 with video processor 100.

Figure 7:
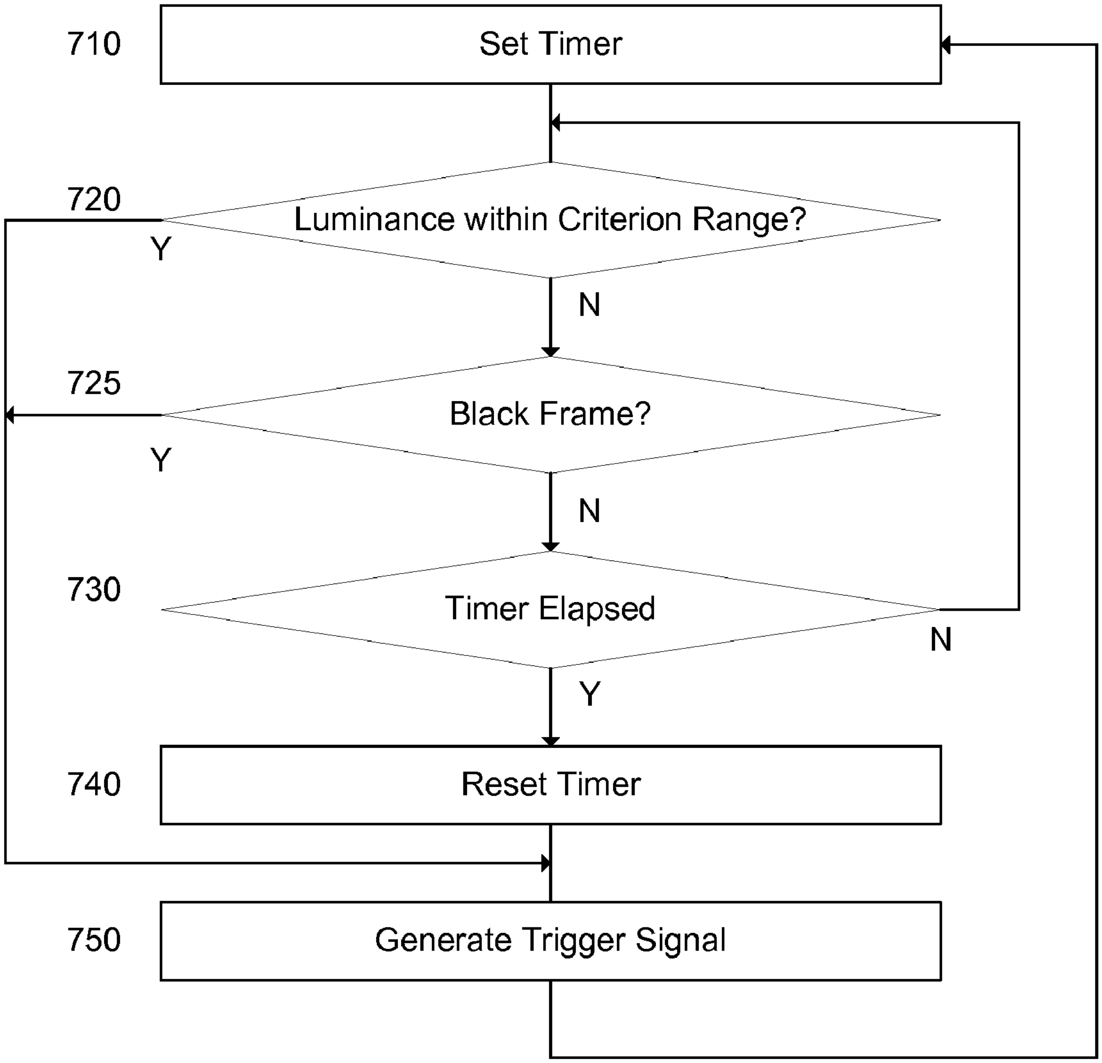
FIG. 7 illustrates a high level flow chart of a method of generating a trigger signal, according to certain embodiments of the present invention.

Reference is now made to FIG. 7 illustrating a high level flow chart of a method of trigger signal generator operation. The trigger generation method combines several predetermined criteria for determining the time of trigger pulse signal generation. In stage 710, timer 194 of FIG. 6 is set to a predetermined value. In stage 720, the frame luminance and optionally frame color values are monitored and compared with the calibration values. In the event that the frame luminance and optionally frame color values are within a predetermined range of the calibration values, in stage 750 a trigger signal is generated.

In the event that in stage 720 the frame luminance and optionally frame color values are not within a predetermined range of the calibration values, in stage 725 the black frame cycle is monitored to determine if it is indicative of a black frame, i.e. a frame in which LCD matrix 174 is set to block the flow of light from illuminator 130. In the event that a black frame is detected, in stage 750 a trigger signal is generated.

In the even that in stage 725 a black frame is not detected, in stage 730 the timer is monitored to determine if the timer set in stage 710 has elapsed. In the event that the timer has elapsed, in stage 740 the timer is reset and in stage 750 a trigger signal is generated. In the event that that the timer has not elapsed, i.e. no criteria have been met, stage 720 as described above is repeated. After the generation of a trigger signal in stage 750, stage 710, as described above is repeated.

Figure 8:
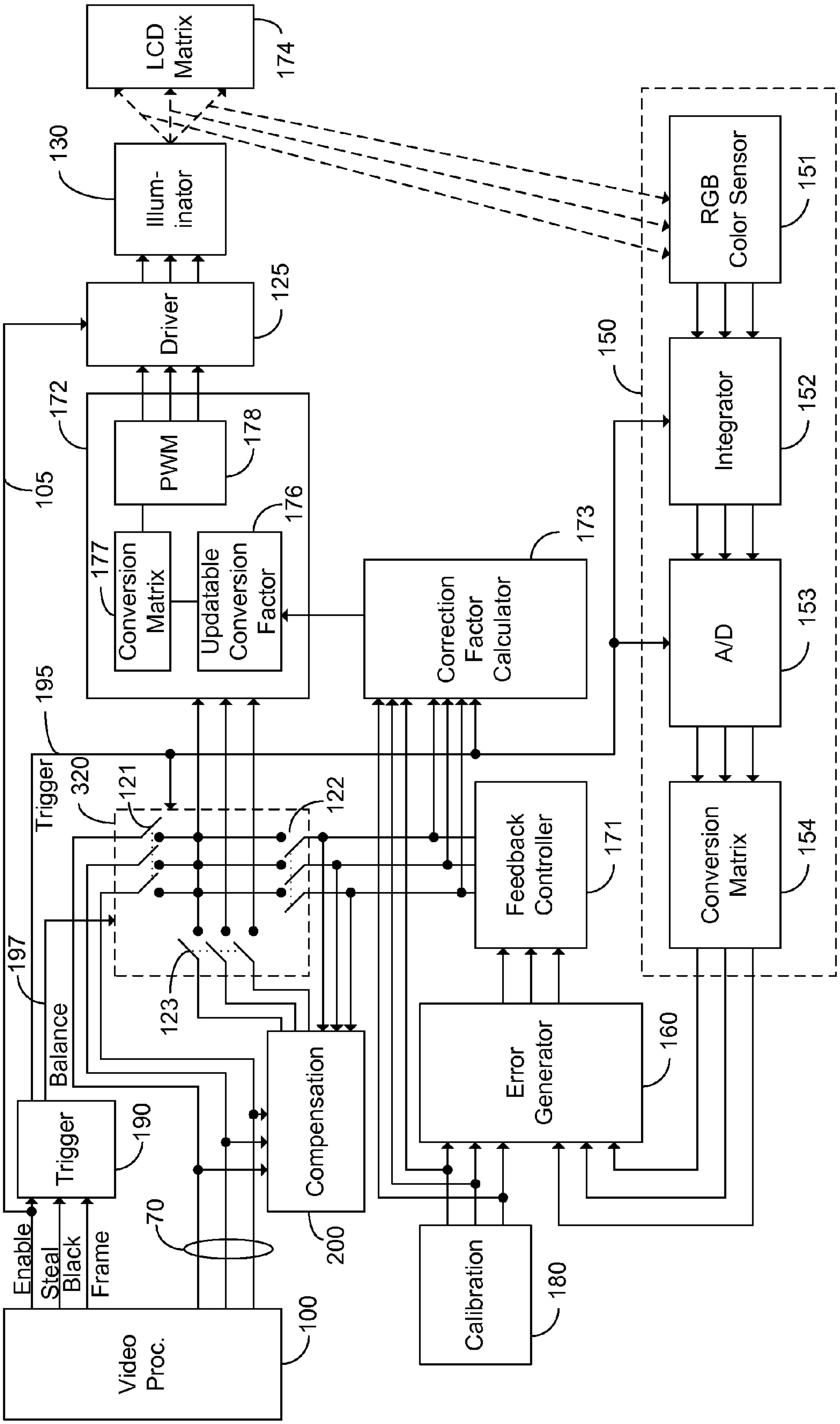
FIG. 8 illustrates a high level block diagram of an embodiment of an LCD illumination system, in accordance with certain embodiments of the invention, utilizing a single PWM pulse and calibration compensation balance, according to an embodiment of the present invention.

FIG. 8 illustrates a high level block diagram of an embodiment of an LCD illumination system, in accordance with certain embodiments of the invention, utilizing a single PWM pulse per frame and calibration compensation balance, according to an embodiment of the present invention. In particular, this embodiment uses a single PWM pulse for "cycle stealing" calibration. A compensation processor 200 outputs color signal values calculated to adjust the pulse width of remaining the PWM signal during the “cycle stealing” thus supplying a balancing compensation effect to the experienced illumination.

The LCD illumination system of FIG. 8 comprises: a video processor 100; a selector 320 comprising a thru-converter switch 121, a color loop controller switch 122 and a compensation processor switch 123; a thru-converter 172 comprising a updatable conversion factor 176, a conversion matrix 177 and a PWM generator 178; a driver 125; an illuminator 130; an LCD matrix 174; an illumination sampler 150 comprising an RGB color sensor 151, an integrator 152, an A/D converter 153 and a color conversion matrix 154; a color loop error generator 160; a feedback controller 171; a correction factor calculator 173; a calibration register 180; a trigger generator 190; and a compensation processor 200. The LCD illumination system of FIG. 8 differs from the LCD illumination system of FIG. 2 primarily in that compensation processor 200 generates pseudo-luminance and optionally color values for the balance of the frame for which a PWM cycle has been stolen for calibration.

A first set of outputs of video processor 100, illustrated as 3 signal lines, and comprising a frame luminance signal 70 and optionally frame color values is connected to an input of thru-converter switch 121 and to an input of compensation processor 200. In one embodiment, frame luminance signal 70 is an analog signal representing a dimming value. In another embodiment, frame luminance signal 70 is an analog signal representing a boosting value. In yet another embodiment, frame luminance signal 70 is a digital signal representing desired luminance. In the absence of optional frame color values, fixed color values are output by video processor 100, optionally responsive to a user input.

An output of video processor 100, denoted enable signal 105, is connected to an input of trigger generator 190 and to the enable input of driver 125. Optionally, a black frame signal and/or a steal frame signal are output by video processor and connected to an input of trigger generator 190. The outputs of thru-converter switch 121, when closed, are connected to the input of thru-converter 172. The output of thru-converter 172 is connected to the input of driver 125, and the output of driver 125 is connected to the input of illuminator 130. A portion of the output of illuminator 130 is optically connected to illumination sampler 150, and more particularly to RGB color sensor 151, and a portion is optically connected to LCD matrix 174. Thus, illumination sampler 150 receives light representative of the light experienced by LCD matrix 174.

The outputs of RGB color sensor 151 are connected to the input of integrator 152. The outputs of integrator 152 are connected to the inputs of A/D converter 153. The outputs of A/D converter 153 are connected to the inputs of color conversion matrix 154. The outputs of color conversion matrix 154 are connected to a first set of inputs of color loop error generator 160, representing the negative inputs thereof. The outputs of calibration register 180 are connected both to a second set of inputs of color loop error generator 160, representing the positive inputs thereof, and to a first set of inputs of correction factor calculator 173. The outputs of color loop error generator 160 are connected to the inputs of feedback controller 171, and the outputs of feedback controller 171 are connected to a second set of inputs of conversion factor calculator 173, to the inputs of color loop controller switch 122 and to respective inputs of compensation processor 200. The outputs of color loop controller switch 122, when closed, are connected to the through input of thru-converter 172. The output of conversion factor calculator 173 is forwarded to updatable conversion factor 176 of thru-converter 172.

The output of trigger generator 190, denoted trigger signal 195, is connected to the trigger input of A/D converter 153 of illumination sampler 150, the trigger input of integrator 152, the stepping/gating input of conversion factor calculator 173, the first control input of selector 320 and optionally (not shown) to a stepping input of feedback controller 171. A frame balance signal 197, output by trigger generator 190, is connected to a second control input of selector 320. In an exemplary embodiment, the frame balance signal represents that portion of the enable signal of a frame for which a trigger signal has been generated, for which the calibration value of feedback controller 171 is not utilized, and instead the output of compensation processor 200 is utilized. The outputs of compensation processor 200 are connected to the inputs of compensation processor switch 123. The outputs of compensation processor switch 123, when closed, are connected to the input of thru-converter 172.

The system of FIG. 8 represents a single illumination zone of a backlight for an LCD matrix display, and thus luminance frame signal 70 and optionally the frame color values represent luminance and optionally color information for a particular zone. In one embodiment video processor 100 is common to all zones of LCD matrix display 174.

In operation, video processor 100 outputs luminance frame signal 70 for each zone, in advance of the enable signal for that zone. Video processor 100 further outputs enable signal 105 for each zone, which turns on driver 125 to cause illumination by illuminator 130 of LCD matrix 174 for the zone at the required time period for the frame. Optionally, video processor 100 further outputs frame color values, for each frame, for each zone. In one embodiment the frame color values are provided consonant with the CIE 1931 color space standard as X, Y, Z values. In another embodiment the frame color values are provided consonant with the CIE LUV color space, in yet another embodiment the frame color values are provided consonant with the CIE LAB color space and in yet another embodiment the frame color values are provided consonant with a RGB color system. In the absence of optional frame color values, fixed color values are supplied by video processor 100, optionally responsive to a user input.

Thru-converter 172 receives, via thru-converter switch 121, frame luminance signal 70 and color values, be they fixed or frame variable. Thru-converter 172 modifies the received values by the contents of updatable conversion factor 176, and then transforms the resultant modified value to PWM values via conversion matrix 177. PWM generator 178, responsive to the PWM values output by conversion matrix 177, generates a PWM signal exhibiting appropriate duty cycles. The PWM signal is output by thru-converter 172, to driver 125 which drives illuminator 130 with PWM drive signals consonant with the received frame luminance signal 70 and color value.

Trigger generator 190, responsive to enable signal 105 received from video processor 100, generates trigger signal 195 at certain intervals. In one embodiment, trigger generator 190 generates trigger signal 195 at periodic intervals. In another embodiment, trigger generator 190 generates trigger signal 195 responsive to particular values of frame luminance and optionally to particular frame color values. In yet another embodiment, trigger generator 190 generates trigger signal 195 responsive to a black frame signal received from video processor 100 indicating the LCD matrix 174 is set to black for the current frame. In yet another embodiment, video processor 100 outputs a steal cycle signal, and trigger 190 generates trigger signal 195 responsive to the received steal cycle signal.

Responsive to trigger signal 195, selector 120 removes the output of video processor 100 from the input of thru-converter 172, and forwards the output of feedback controller 171 to the input of thru-converter 172. In particular, when trigger signal 195 is OFF, selector switch 121 provides thru-converter 172 with frame luminance signal 70 and optional color values. When trigger signal 195 is ON, thru-converter switch 121 provides thru-converter 172 with the output signal of feedback controller 171.

Feedback controller 171 is preferably a proportional controller, and further preferably one of a proportional integral differential (PID) controller and a proportional differential (PD) controller, and is operative responsive to the received color loop error generator to generate values in a system consonant with the system of the color signals, be they variable or fixed, directed to converge the output of illumination sampler 150 with the calibration luminance signal and calibration color values, stored in calibration register 180.

Correction factor calculator 173, responsive to the values generated by feedback controller 171, and the calibration luminance and color values output by calibration register 180, calculates a correction factor for the current status of the color loop defined by thru-converter 172, driver 125, illuminator 130 and illumination sampler 150. The correction factor calculated by correction factor calculator 173 is forwarded to updatable conversion factor 176 to be used by thru-converter 172 for subsequent thru conversion of frame luminance and color values.

RGB color sensor 151, outputs a signal representative of the output of illuminator 130. Integrator 152, cleared responsive to trigger signal 190, integrates the output of RGB color sensor 151 over a predetermined portion of a frame. The predetermined portion may be one or more PWM cycles, without exceeding the scope of the invention. A/D converter 153, responsive to trigger signal 190, samples the output of integrator 152 at the end of the predetermined portion of the frame, prior to integrator 152 being cleared. Color conversion matrix 154 is operative to convert the received sample RGB values to values consonant with the color system of calibration register 180.

Color loop error generator 160 receives at its positive input a calibration luminance signal and calibration color values, stored in calibration register 180, and at its negative input the output of color conversion matrix 154. Color loop error generator 160 outputs a difference signal responsive to the difference between the output of color conversion matrix 154 and the calibration luminance signal and calibration color values of calibration register 180.

The output of feedback controller 171 is further received at compensation processor 200, which compares the output of feedback controller 171 with frame luminance signal 70 and color signals output by video processor 100. Compensation processor 200 is operative to calculate appropriate values for luminance and optionally color for the balance of the frame, for which the values output by feedback controller 171 are not utilized. Frame balance signal 197 output by trigger generator 190 sets selector 320 to close compensation processor switch 123 thereby forwarding the output of compensation processor 200 to thru-converter 172 for the balance of the frame. Thus, the change in LCD illumination during ON period of trigger signal 195 is compensated for by compensation processor 200 and is preferably unnoticeable to the user. In one further embodiment, only frames with values of the frame luminance signal and the optional frame color values within a predetermined range of the calibration luminance signal and calibration color values are utilized.

There is no requirement that feedback controller 171 act at frame speeds, since trigger signal 195 is preferably timed to occur no faster than the speed of feedback controller 171. Changes to the constituent LEDs of illuminator 130 are gradual, and thus slow acting feedback controller 171 may be used to update updatable conversion factor 176 of thru-converter 172.

Thus, a conversion factor update is carried out responsive to trigger signal 195 output by trigger generator 190. Trigger signal 195 sets off a video frame or a ‘cycle stealing’ period, during which, selector switches 121, 122, and 123 change state and the output signals of feedback controller 171 are directed to PWM modulator 178, following which the output signals of compensation processor 200 are directed to PWM modulator 178. RGB color sensor 151 detects a sample of the illumination during the ‘cycle stealing’ period. The output of RGB color sensor 151 is integrated by integrator 152 and sampled by A/D converter 153. The output of A/D converter 153 is converted by color conversion matrix 154 to an appropriate color space model consonant with the color system of the contents of calibration register 180. After the calibration frame or ‘cycle stealing’ period, updatable conversion factor 176 is updated by correction factor calculator 173 and thru-converter 172 returns to routine operation. The balance of the PWM cycles for each frame for which cycles have been stolen are set to values determined by compensation processor 200.

Figure 9:
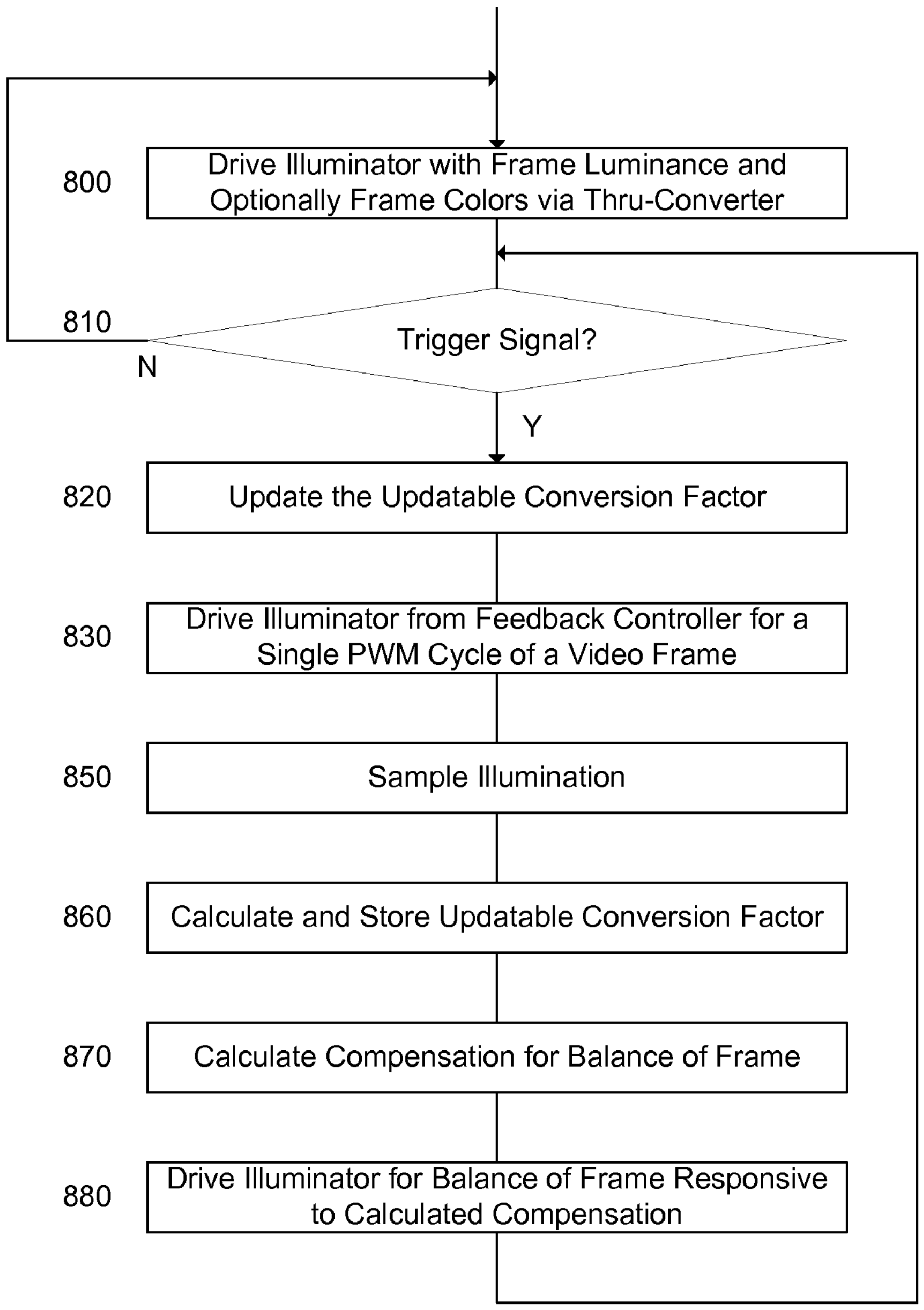
FIG. 9 illustrates a high level flow chart of the illumination calibration method of FIG. 8, utilizing a single pulse PWM and calibration compensation balance, according to certain embodiments of the present invention.

FIG. 9 illustrates a high level flow chart of the illumination calibration method of FIG. 8, utilizing a single pulse PWM and calibration compensation balance, according to an embodiment of the present invention. In stage 800, the illuminator is driven with frame luminance signals, and optionally with frame color signals, via thru-converter 172. In stage 810, trigger signal 195, is monitored. In the event that in stage 810 trigger signal 195 is not detected, stage 800 as described above is repeated. In the event that in stage 810 trigger signal 195 is detected, in stage 820 the method enters the calibration portion of the process, and in particular the conversion factor of the thru-converter is updated. In stage 830, illuminator 130 is driven responsive to feedback controller 171 for a single PWM cycle of the enabled portion of the frame. In stage 840, the illumination as a result of stage 830 is sampled by illumination sampler 150. In stage 850, the conversion factor for the next instance of stage 810 is calculated and stored, to be updated by the next instance of stage 820.

In stage 860, the appropriate luminance and optionally color for the balance of the enable portion of the frame is calculated. Preferably, the luminance and optionally color for the balance of the frame are directed so that over the entire frame the average luminance, and preferably color, are close to, or consonant with, the requested frame luminance and colors of video processor 100. In stage 870, responsive to balance signal 197, illuminator 130 is driven via thru-converter 172 and driver 125 responsive to the calculated compensating luminance and colors of stage 860. Stage 800, as described above, is then repeated.

The method of FIG. 8 thus “steals” a single PWM cycle, or a plurality of PWM cycles from an entire frame, performs calibration of thru-converter 172 of FIG. 8 based on stolen cycles, and compensates the balance of the frame so as to be transparent to a viewer. Convergence of feedback controller 171 of FIG. 8 thus requires a plurality of stolen PWM cycles, at intervals selected by trigger generator 190.

The above has been explained in an embodiment in which a single PWM cycle is “stolen” however this is not meant to be limiting in any way. In another embodiment, 2 or more PWM cycles of a particular frame are stolen without exceeding the scope of the invention.

Figure 10:
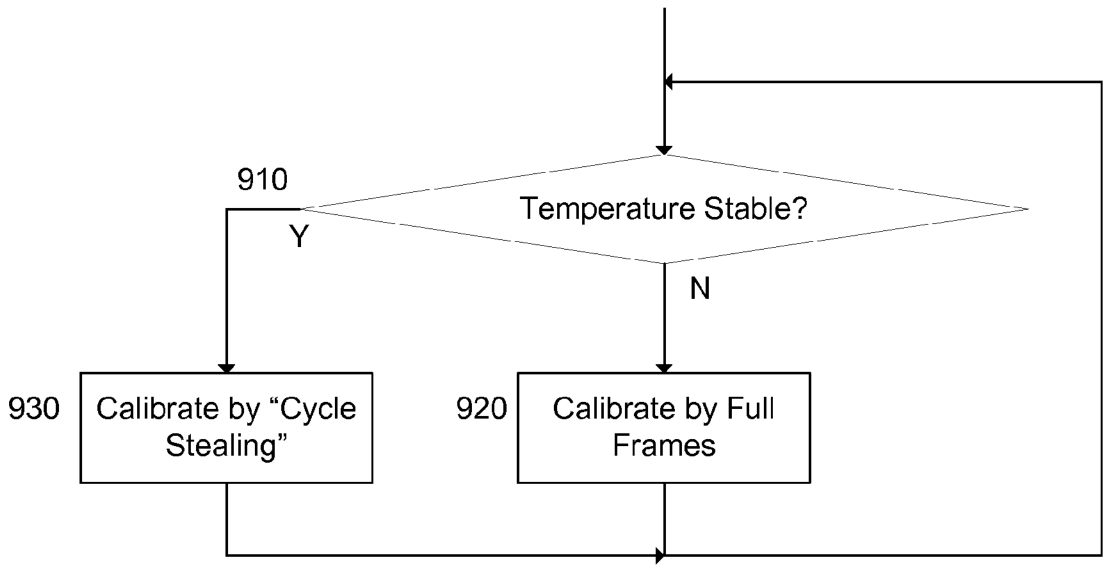
FIG. 10 illustrates a flow chart of the steps used for selecting a calibration method, according to certain embodiments of the present invention.

Reference is now made to FIG. 10 depicting a flow chart of a method of selection between the calibration methods of FIGS. 4, 5 described above. The selected calibration method is in one embodiment determined by the temperature stability of the LED strings of luminaire 30 and illuminator 130, respectively. When power is turned on there is a warm up time during which temperature of the constituent LEDs change rapidly. The temperature stabilizes after the warm up time. In stage 910, the stability of the temperature of the constituent LEDs, or an analog thereof such as a case temperature, is monitored. Stability of temperature is determined by comparing temperature changes over time. In the event that in stage 910 the monitored temperature is not stable, thus rapid changes in the characteristic output of the constituent LEDs is to be anticipated, in stage 920 calibration is done over complete frames as described above in relation to FIG. 4. Thus, calibration converges over a single frame, and is updated at relative short intervals.

In the event that in stage 910 it is determined that the operating temperature of the constituent LEDs is stable, in stage 920 calibration is accomplished in accordance with the cycle stealing method of FIG. 5 or FIG. 9. It is to be noted that cycle stealing in accordance with FIG. 5 or FIG. 9 requires a longer period to converge, however in the event of temperature stability this is not considered to be problematic.

It will be appreciated that the above-described methods may be varied in many ways including changing the order of steps, and/or performing a plurality of steps concurrently.

It should also be appreciated that the above described description of methods and apparatus are to be interpreted as including apparatus for carrying out the methods, and methods of using the apparatus, and computer software for implementing the various automated control methods on a general purpose or specialized computer system, of any type as well known to a person of ordinary skill, and which need not be described in detail herein for enabling a person of ordinary skill to practice the invention, since such a person is well versed in industrial and control computers, their programming, and integration into an operating system.

Having described the invention with regard to certain specific embodiments, it is to be understood that the description is not meant as a limitation since further modifications may now suggest themselves to those skilled in the art, and it is intended to cover such modifications, as fall within the scope of the appended claims.

For the main embodiments of the invention, the particular selection of type and model is not critical, though where specifically identified, this may be relevant. The present invention has been described using detailed descriptions of embodiments thereof that are provided by way of example and are not intended to limit the scope of the invention. No limitation, in general, or by way of words such as "may", "should", "preferably", "must", or other term denoting a degree of importance or motivation, should be considered as a limitation on the scope of the claims or their equivalents unless expressly present in such claim as a literal limitation on its scope. It should be understood that features and steps described with respect to one embodiment may be used with other embodiments and that not all embodiments of the invention have all of the features and/or steps shown in a particular figure or described with respect to one of the embodiments. That is, the disclosure should be considered complete from combinatorial point of view, with each embodiment of each element considered disclosed in conjunction with each other embodiment of each element (and indeed in various combinations of compatible implementations of variations in the same element). Variations of embodiments described will occur to persons of the art. Furthermore, the terms "comprise," "include," "have" and their conjugates, shall mean, when used in the claims, "including but not necessarily limited to." Each element present in the claims in the singular shall mean one or more element as claimed, and when an option is provided for one or more of a group, it shall be interpreted to mean that the claim requires only one member selected from the various options, and shall not require one of each option. The abstract shall not be interpreted as limiting on the scope of the application or claims.

It is noted that some of the above described embodiments may describe the best mode contemplated by the inventors and therefore may include structure, acts or details of structures and acts that may not be essential to the invention and which are described as examples. Structure and acts described herein are replaceable by equivalents, which perform the same function, even if the structure or acts are different, as known in the art. Therefore, the scope of the invention is limited only by the elements and limitations as used in the claims.

We claim:

1. A color controller for a luminaire, the color controller comprising:

a thru-converter arranged to convert an input signal to at least one luminaire drive signal;

an illumination sampler arranged to sample an optical output from the luminaire and generate a representation thereof; and a feedback controller arranged to receive said output representation and generate an updatable conversion factor in cooperation with a calibration luminance and color values, wherein said thru-converter arrangement is responsive to a trigger signal to operate in one of a first mode and a second mode different than said first mode, wherein in said first mode said thru-converter is arranged to generate said luminaire drive signal for the luminaire in an open loop responsive to said input signal being a frame luminance signal and target color signals, wherein said conversion to said at least one luminaire drive signal is responsive to the updatable conversion factor and not responsive to the optical output from the luminaire generated during said first mode operation, and wherein in said second mode said thru-converter is arranged to generate said luminaire drive signal for the luminaire in a closed loop responsive to said feedback controller, said input signal being the calibration luminance and color values, said feedback controller responsive to said output representation of the optical output of the luminaire, the optical output of the luminaire generated during said second mode operation.

2. A color loop controller according to claim 1, further comprising a correction factor calculator responsive to said feedback controller, wherein said correction factor calculator is arranged to calculate an updated conversion factor for said thru-converter when said thru-converter operation is in said second mode, and wherein said thru-converter is arranged to update said updatable conversion factor for use when said thru-converter is in said first mode, responsive to said correction factor calculator.

3. A color loop controller according to claim 1, wherein said illumination sampler comprises an RGB color sensor and an integrator.

4. A color loop controller according to claim 1, wherein said illumination sampler comprises an RGB color sensor, an integrator, an analog to digital converter and a color conversion matrix, said analog to digital converter being responsive to the trigger signal.

5. A color loop controller according to claim 1, wherein said second mode is maintained for the illumination period of a full frame.

6. A color loop controller according to claim 1, wherein said second mode is maintained for less than the illumination period of a full frame.

7. A color loop controller according to claim 1, wherein said luminaire drive signal is constituted of a pulse width modulated signal exhibiting a cycle period, wherein a frame exhibits a plurality of pulse width modulated signal cycles, and wherein said second mode is maintained for a single cycle period of said frame.

8. A color loop controller according to claim 7, further comprising a compensation processor in communication with said feedback controller and arranged to generate a compensating luminance signal and a compensating target color signals for the remaining pulse width modulated signal cycles of said frame, wherein said thru-converter operation is responsive to the trigger signal to operate in a third mode, and wherein in said third mode said thru-converter is arranged to generate said luminaire drive signal for the luminaire responsive to said compensating luminance signal and compensating target color signals, said compensating luminance signal and said compensating target color signals generated by said compensation processor such that luminance of the optical output of the luminaire responsive to the remaining pulse width modulated signal cycles of said frame compensates for said second mode single cycle period of said frame.

9. A color loop controller according to claim 8, wherein said compensating luminance signal and compensating target color signals are determined responsive to the frame luminance signal and target color signals and to the feedback controller.

10. A color loop controller according to claim 7, wherein said feedback controller is arranged to converge over a plurality of single cycle periods of disparate frames.

11. A color loop controller according to claim 7, wherein a trigger generator is arranged to receive a temperature indication of said luminaire, and wherein in the event that said temperature indication is stable over a predetermined time frame, said second mode is maintained for said single cycle period, and in the event that said temperature indication is not stable over said predetermined time frame, said second mode is maintained for the full frame.

12. A color loop controller according to claim 1, wherein said trigger signal is periodic.

13. A color loop controller according to claim 1, wherein said target color signals are frame variable.

14. A color loop controller according to claim 1, further comprising a trigger generator arranged to generate said trigger signal.

15. A color loop controller according to claim 14, wherein said trigger generator is arranged to:

compare at least one of said input frame luminance signal and said input target color signals with a respective one of the calibration luminance and color values; and generate said trigger signal in the event that said compared at least one input signal is within a predetermined range of said respective at least one calibration value.

16. A color loop controller according to claim 14, wherein said trigger generator is arranged to generate said trigger signal responsive to a received signal indicative of a black frame.

17. A method of color control for a luminaire, the method comprising:

converting an input frame luminance signal and an input target color signals to a first luminaire drive signal in an open loop mode, said open loop mode arranged to be responsive to an updatable conversion factor and not responsive to an optical output of the luminaire generated responsive to the first luminaire drive signal;

driving the luminaire with the first luminaire drive signal;

generating, responsive to a trigger signal, a second luminaire drive signal in a closed loop mode;

driving the luminaire with the second luminaire drive signal in place of the first luminaire drive signal;

sampling the optical output of the luminaire, the optical output of the luminaire responsive to the driving of the luminaire with the second luminaire drive signal, wherein said second luminaire drive signal is responsive to a calibration luminance and color values and said sampled optical output of the luminaire;

generating, responsive to said sampled optical output, a revised conversion factor; and updating said updatable conversion factor with said revised conversion factor.

18. A method according to claim 17, further comprising calculating said revised conversion factor.

19. A method according to claim 17, wherein said sampling comprises integrating an output of a color sensor over a predetermined time period.

20. A method according to claim 17, wherein the luminaire is driven responsive to the second luminaire drive signal for the illumination period of a full frame.

21. A method according to claim 17, wherein the luminaire is driven responsive to the second luminaire drive signal for less than the illumination period of a full frame.

22. A method according to claim 17, wherein said second luminaire drive signal is a pulse width modulated signal exhibiting a duty cycle, and wherein the luminaire is driven responsive to the second luminaire drive signal for only a single cycle period of a frame.

23. A method according to claim 22, further comprising:

generating a third luminaire drive signal, said third luminaire drive signal responsive to said calibration luminance and color values and to said input frame luminance and said input target color signals; and driving the luminaire for the balance of the frame with said third luminaire drive signal, said third luminaire drive signal arranged such that luminance of the optical output of the luminaire responsive to the remaining pulse width modulated signal cycles of said frame compensates for said second luminaire drive signal single cycle period of said frame.

24. A method according to claim 22, wherein said generating said revised conversion factor is over a plurality of frames.

25. A method according to claim 22, wherein said generating said revised conversion factor is over a plurality of non-contiguous frames.

26. A method according to claim 22, wherein said trigger signal is responsive to a temperature indication of the luminaire, and wherein the luminaire is driven responsive to the second luminaire drive signal for only a single cycle period of a frame only in the event that the temperature indication is stable over a predetermined time period.

27. A method according to claim 17, wherein the trigger signal is periodic.

28. A method according to claim 17, wherein the target color signal may vary from frame to frame.

29. A method according to claim 28, further comprising:

comparing at least one of said input frame luminance signal and said input target color signals with a respective one of the calibration luminance and color values; and generating the trigger signal in the event that said compared input signal is within a predetermined range of said respective calibration value.

30. A method according to claim 17, further comprising generating a trigger signal responsive to a received signal indicative of a black frame.

* * * * *